United States Patent
Koorapaty et al.

(10) Patent No.: US 8,861,549 B2
(45) Date of Patent: Oct. 14, 2014

(54) MULTIPLE COMPATIBLE OFDM SYSTEMS WITH DIFFERENT BANDWIDTHS

(75) Inventors: Havish Koorapaty, Cary, NC (US); Kumar Balachandran, Cary, NC (US); Rajaram Ramesh, Raleigh, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1499 days.

(21) Appl. No.: 12/170,579

(22) Filed: Jul. 10, 2008

(65) Prior Publication Data

US 2009/0116435 A1     May 7, 2009

Related U.S. Application Data

(60) Provisional application No. 60/996,161, filed on Nov. 5, 2007.

(51) Int. Cl.
| | |
|---|---|
| *H04J 3/22* | (2006.01) |
| *H04L 27/00* | (2006.01) |
| *H04L 27/26* | (2006.01) |
| *H04L 5/00* | (2006.01) |
| *H04J 11/00* | (2006.01) |

(52) U.S. Cl.
CPC ........... *H04L 5/0007* (2013.01); *H04J 11/0069* (2013.01); *H04L 27/0008* (2013.01); *H04L 27/2601* (2013.01)
USPC ........................................................ 370/470

(58) Field of Classification Search
USPC ................................................. 370/465–467
See application file for complete search history.

(56) References Cited

U.S. PATENT DOCUMENTS

| | | | |
|---|---|---|---|
| 5,946,634 | A * | 8/1999 | Korpela ..................... 455/552.1 |
| 7,626,921 | B2 | 12/2009 | Egashira et al. |
| 7,643,567 | B2 | 1/2010 | Egashira et al. |
| 2002/0080816 | A1 | 6/2002 | Spinar et al. |
| 2004/0081131 | A1 | 4/2004 | Walton et al. |
| 2005/0063345 | A1 | 3/2005 | Wu et al. |
| 2005/0201325 | A1 | 9/2005 | Kang et al. |
| 2005/0266896 | A1 | 12/2005 | Son et al. |

(Continued)

FOREIGN PATENT DOCUMENTS

| | | |
|---|---|---|
| EP | 1622290 | 7/2005 |
| EP | 1 798 883 A | 6/2007 |

(Continued)

OTHER PUBLICATIONS

PCT International Preliminary Report on Patentability, dated Feb. 4, 2010 for PCT/SE2008/050922.

(Continued)

*Primary Examiner* — Thai Hoang
(74) *Attorney, Agent, or Firm* — Nixon & Vanderhye P.C.

(57) ABSTRACT

The technology provides a frame handler, a controller, and a frame structure design for a new radio communications system that provides backward compatibility with an existing or legacy radio communications system with lower signal bandwidth. Data to be transmitted to the new and legacy radio terminals is processed into a frame using a frame format that is compatible with both the new radio access technology system and the legacy radio access technology system so that both types of radio terminals may receive and extract data from the frame intended for each of those radio terminals. The format allows new and legacy radio terminal communications across the different bandwidths employed by the new and legacy systems.

43 Claims, 8 Drawing Sheets

(56) References Cited

U.S. PATENT DOCUMENTS

| | | | |
|---|---|---|---|
| 2006/0018279 A1 | 1/2006 | Agrawal et al. | |
| 2006/0092892 A1 | 5/2006 | Trachewsky | |
| 2006/0165114 A1 | 7/2006 | Diepstraten et al. | |
| 2006/0239241 A1 | 10/2006 | Eom et al. | |
| 2006/0274852 A1 | 12/2006 | Trachewsky | |
| 2007/0026881 A1 | 2/2007 | Tzavidas et al. | |
| 2007/0040703 A1 | 2/2007 | Akkarakaran et al. | |
| 2007/0064669 A1* | 3/2007 | Classon et al. | 370/347 |
| 2007/0064728 A1* | 3/2007 | Nitta et al. | 370/466 |
| 2007/0133388 A1 | 6/2007 | Lee et al. | |
| 2007/0211787 A1 | 9/2007 | Harris et al. | |
| 2007/0230416 A1 | 10/2007 | Harris et al. | |
| 2007/0286127 A1* | 12/2007 | Inohiza | 370/331 |
| 2008/0095195 A1* | 4/2008 | Ahmadi et al. | 370/478 |
| 2008/0151809 A1 | 6/2008 | Chindapol et al. | |
| 2008/0161000 A1 | 7/2008 | Li et al. | |
| 2008/0165881 A1 | 7/2008 | Tao et al. | |
| 2008/0232401 A1* | 9/2008 | Ahmadi et al. | 370/469 |
| 2009/0092085 A1 | 4/2009 | Ramesh et al. | |
| 2009/0109932 A1 | 4/2009 | Maheshwari et al. | |
| 2009/0116425 A1 | 5/2009 | Lim et al. | |
| 2009/0116435 A1 | 5/2009 | Koorapaty et al. | |
| 2009/0122771 A1* | 5/2009 | Cai | 370/338 |
| 2009/0131110 A1 | 5/2009 | Balachandran et al. | |
| 2009/0161616 A1 | 6/2009 | Ramesh et al. | |
| 2009/0185476 A1 | 7/2009 | Tsai et al. | |
| 2009/0201860 A1 | 8/2009 | Sherman et al. | |
| 2009/0252116 A1 | 10/2009 | von Brandt et al. | |
| 2011/0013564 A1* | 1/2011 | Zou et al. | 370/328 |
| 2011/0090879 A1* | 4/2011 | Hamiti et al. | 370/338 |
| 2011/0261730 A1* | 10/2011 | Moon et al. | 370/280 |

FOREIGN PATENT DOCUMENTS

| | | | |
|---|---|---|---|
| EP | 2 019 528 A | | 1/2009 |
| EP | 2 026 616 A | | 2/2009 |
| JP | 2007-180618 | | 7/2007 |
| JP | 2007-208654 | | 8/2007 |
| WO | 2005/109705 A | | 11/2005 |
| WO | WO 2008/049028 | | 4/2008 |
| WO | 2009/023808 A | | 2/2009 |

OTHER PUBLICATIONS

Supplementary EP Search Report mailed Nov. 24, 2010 in EP application 08847468.9.
Cudak et al, "Draft IEEE802.16m requirements", IEEE C802.16M-07/076, [Online] Mar. 5, 2007, pp. 1-146, XP002507326.
3GPP TS 36.300 V8.2.0 (Sep. 2007) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).
3GPP TS 36.211 V8.0.0 (Sep. 2007) Technical Specification 3rd Generation Partnership Project; Technical Specification Group Radio Access Network; Evolved Universal Terrestrial Radio Access (E-UTRA); Physical channels and modulation (Release 8).
U.S. Final Office Action mailed Feb. 3, 2011 in U.S. Appl. No. 12/354,159.
U.S. Office Action mailed Aug. 2, 2010 in U.S. Appl. No. 12/354,159.
International Search Report mailed May 20, 200 in PCT Application No. PCT/SE2008/051451.
Ryu et al, "IEEE 802..16m Requirements on Legacy Support", Feb. 23, 2007, retrieved from the Internet URL: wireless.org/tgm/contrib./C80216m-07_037.pdf.
Chang et al, "CDMA Code Partitioning for a R-UL Ranging Control", Jan. 8, 2007, retrieved from the Internet URL: wireless.org/relay/contrib./C80216j-07_128.pdf.
Jeon et al "Dedicated Ranging Opportunity for RS", Mar. 5, 2007, retrieved from the Internet URL: wireless.org/relay/contrib./C80216j-07_175.pdf.
Boone et al, "Strategies for Fast Scanning and Handovers in WiMax/802.16".
Kim, "IEEE 802.16/WiMax Security".
International Preliminary Report on Patentability mailed Feb. 4, 2010 in corresponding PCT Application No. PCT/SE2008/050922.
Related U.S. Appl. No. 12/138,000, filed Jun. 12, 2008; Inventor: Ramesh et al.
Koorapaty, Backward Compatible Use of Large Bandwidths for 802.16m, IEEE 802.16 Broadband Wireless Access Working Group <http://ieee802.org/16>. Jan. 16, 2008.
U.S. Appl. No. 12/259,068, filed Oct. 27, 2008; Inventor: Balachandran et al.
U.S. Appl. No. 12/354,159, filed Jan. 15, 2009; Inventor: Tsai et al.
U.S. Office Action mailed May 12, 2011 in U.S. Appl. No. 12/138,000.
U.S. Office Action mailed May 11, 2011 in U.S. Appl. No. 12/259,068.
Final Office Action mailed Nov. 9, 2011 in U.S. Appl. No. 12/259,068.
Notice of Allowance mailed Jan. 19, 2012 in U.S. Appl. No. 12/259,068.
Office Action mailed Nov. 9, 2011 in co-pending U.S. Appl. No. 12/259,068.
Orlik et al., "Single Carrier Uplink Frame Format", IEEE C802.16M-08/056, Jan. 16, 2007.
U.S. Appl. No. 12/333,147, filed Dec. 11, 2008; Inventor: Ramesh et al.
Office Action mailed Aug. 14, 2012 in U.S. Appl. No. 12/333,147.
Office Action mailed Mar. 1, 2012 in U.S. Appl. No. 12/333,147.
Supplemental European Search Report dated Aug. 28, 2012 in European Application No. EP08794147.
Koorapaty, Havish: "Backward Compatible Use of Larger Bandwidth—IEEE C802.16m-07/249", IEEE 802.16 Broadband Wireless Access Working Group, Nov. 7, 2007, pp. 1-7, XP55035875.
English Summary of Japanese Official Action mailed Nov. 21, 2012 in Japanese Application No. 2010-533037.
"Views on 802.16m High-Level System Requirements", Document No. IEEE C802.16m-07_008, Jan. 15, 2007.
Office Action mailed Feb. 21, 2014 in U.S. Appl. No. 12/333,147.
Office Action dated Jul. 2, 2014 in U.S. Appl. No. 12/333,147, pp. 1-43.

\* cited by examiner

MULTIPLE COMPATIBLE OFDM SYSTEMS WITH DIFFERENT BANDWIDTHS

PRIORITY APPLICATION

Priority is claimed from U.S. provisional patent application Ser. No. 60/996,161, filed on Nov. 5, 2007, the disclosure of which is incorporated herein by reference.

TECHNICAL FIELD

The technical field relates to compatibility between different radio communications systems, and in an example embodiment described below, to compatibility between legacy and new radio communications systems that use orthogonal frequency division multiplexing (OFDM) or orthogonal frequency division multiple access (OFDMA).

BACKGROUND

In a typical radio communications system, user communications radio terminals, often referred to as user equipment units (UEs), communicate via a radio access network (RAN) with other networks like the Internet. The radio access network (RAN) covers a geographical area which is divided into cell areas, with each cell area being served by a base station, which in some networks is also called a "NodeB" or an enhanced Node B. A cell is a geographical area where radio coverage is provided by radio base station equipment at a base station site.

Third Generation (3G) cellular radio systems like Universal Mobile Telecommunications System (UMTS) operating in Wideband Code Division Multiple Access (WCDMA) use different types of radio channels including circuit-switched radio channels and packet-switched radio channels. Mixed voice/data, circuit/packet switched 3G systems evolved from voice-centric, circuit-switched second generation (2G) systems. Circuit-switched channels, sometimes called dedicated channels, are usually allocated to only one user for the duration of a connection carrying information only associated with that one user. Packet-switched channels are shared, scheduled channels over which packets for multiple user connections are carried. Fourth generation (4G), OFDMA-based systems, like the Long Term Evolution (LTE) of UMTS and Worldwide Interoperability for Microwave Access (WiMAX), use an air interface design based on packet data. Dedicated traffic channels are eschewed in favor of shared radio resources in order to unify the system's ability to handle differing traffic characteristics. Medium access control is migrating towards a paradigm where user devices request resources from a base station resource scheduler which grants available radio resources to such requests in accordance with a schedule. In response to actual requests to transmit data from and/or to a user equipment (UE) in the uplink and/or the downlink, the scheduler in the base station dynamically allocates radio resources to satisfy the quality of service requirements associated with the type of data traffic to be transmitted, and at the same time, tries to optimize the system capacity.

The IEEE 802.16 Working Group on Broadband Wireless Access Standards develops formal specifications for the global deployment of broadband Wireless Metropolitan Area Networks (MAN). Although the 802.16 family of standards is officially called WirelessMAN, it is often referred to as WiMAX. WiMAX/IEEE 802.16e uses scalable orthogonal frequency division multiple access (OFDMA) to support large channel bandwidths, e.g., between 1.25 MHz and 20 MHz with up to 2048 sub-carriers. Another important physical layer feature is support for multiple-in-multiple-out (MIMO) antennas in order to provide good performance in NLOS (non-line-of-sight) conditions (or higher bandwidth). Multi-antenna techniques can significantly increase the data rates and reliability of a wireless communication system. The performance is improved if the transmitter and the receiver use multiple antennas resulting in a multiple-input multiple-output (MIMO) communication channel. Such systems and/or related techniques are commonly referred to as MIMO.

The general problem addressed in this application is how to best design a new higher bandwidth communications system so that it is backward compatible with an existing communications system with lower signal bandwidth. For an OFDMA-based example in the IEEE 802.16 set of standards, a new standard, IEEE 802.16m, must be backward compatible with an existing IEEE 802.16e standard, as further specified by the WiMAX Forum System Profiles, which is the WirelessMAN-OFDMA reference system. Although IEEE 802.16m will operate at higher data rates than what is currently supported by the WirelessMAN-OFDMA reference system, with channel bandwidths up to 20 MHz, it is desirable for the IEEE 802.16m system to support IEEE 802.16e communications that use only 5 or 10 MHz channels For ease of reference, abbreviated forms of 802.16e/16e and 802.16m/16m are used below.

SUMMARY

A base station of a radio access network includes transceiver circuitry that communicates a frame of information over a radio interface with first radio terminals configured in accordance with a first radio access technology system that permits radio terminal communications over a first channel bandwidth and with second radio terminals configured in accordance with a second radio access technology system that permits radio terminal communications over a second channel bandwidth greater than the first channel bandwidth. A frame handler in the base station processes data to be transmitted to the first and second radio terminals into a frame using a frame format that is compatible with both the first radio access technology system and the second radio access technology system so that both the first and second radio terminals may receive and extract data from the frame intended for each of those radio terminals. The frame format is designed for the second radio access technology system and is backward compatible with the first radio access technology system. Specifically, the frame format allows new and legacy radio terminal communications across the different bandwidths employed by the new and legacy systems.

The frame format includes data transmitted to first radio terminals using a sub-band of the second channel bandwidth, where the sub-band corresponds to the first channel bandwidth. In other words, the second channel bandwidth is divided into multiple sub-bands, and each sub-band corresponds to the first channel bandwidth. The frame format includes data transmitted to one of the second radio terminals across multiple sub-bands in the frame and data transmitted to each of one or more first radio terminals using only a single sub-band for each of the first radio terminals.

In the first radio access technology system, each sub-band includes two guard bands. The frame format includes data transmitted to one of the second radio terminals using multiple sub-bands and one or more of the guard bands. Those guard bands used are preferably not located at an upper or lower end of the second bandwidth.

One or more parameters defining the frame format, such as the frame length, channel bandwidth being used, the ratio of downlink to uplink symbols, permutation bases for subchannel definitions, etc., are included in a "base" sub-band. In one example embodiment, a control message in the base sub-band is directed to the second radio terminals configured in accordance with the second radio access technology system that indicates sub-band allocations to the one or more second radio terminals. In another example embodiment, the base sub-band includes a control message associated with the first radio access technology system that indicates sub-band allocations to the one or more second radio terminals.

One or more preambles associated with the first radio access technology system may be used to indicate which of the sub-bands is the base sub-band. A first set of one or more preambles associated with the first radio access technology system identify a sub-band as being associated with the first radio access technology system, and a second, different set of one or more preambles associated with the second radio access technology system identify a sub-band as being associated with the second radio access technology system. In one example embodiment, a subset of the second, different set of one or more preambles indicates which sub-band is the base sub-band.

Bandwidth allocations for a sub-band associated with the first radio access technology system may be signaled to radio terminals using one or more control messages within that sub-band so that each of the first radio terminals only receives bandwidth allocations in one sub-band while each of the second radio terminals may receive allocations in multiple sub-bands which are combined and treated as one allocation. The allocations may include downlink and uplink bandwidth allocations.

In a preferred, non-limiting example embodiment, the first radio access technology system is a system that uses IEEE 802.16e technology and the second radio access technology system is a system that uses IEEE 802.16m technology. The first channel bandwidth is 5 MHz, and the second channel bandwidth 15-20 MHz.

Another aspect of the technology relates to a radio terminal apparatus that includes transceiver circuitry for communicating a frame of information over a radio interface to a base station. The radio terminal and the base station are configured in accordance with a first radio access technology system that permits radio communications over a first channel bandwidth that is greater than a second channel bandwidth associated with a second radio access technology that the base station is also configured to support. The first channel bandwidth includes multiple sub-bands and each sub-band corresponds to the second bandwidth. A frame handler processes data to be transmitted to the base station into a frame using a frame format that is compatible with both the first radio access technology and the second radio access technology. The data is allocated for transmission across multiple sub-bands. In a preferred example, the first radio access technology is IEEE 802.16e technology and the second radio access technology uses IEEE 802.16m technology.

Additionally, the sub-bands may include guard sub-carriers in the first radio access technology. In that case, the frame format includes data transmitted using multiple sub-bands and one or more of the guard sub-carriers.

The transceiving circuitry includes an OFDM receiver for demodulating a signal from the base station transmitted across the first channel bandwidth and decode the signal. The decoded signal includes a base sub-band with one or more parameters defining the frame format. In one example embodiment, a use of one or more preamble sequences sent by the base station indicates which of the sub-bands is the base sub-band. In another example embodiment, a first set of one or more preambles associated with the first radio access technology system included in a sub-band identifies that sub-band as being associated with the first radio access technology system and a second, different set of one or more preambles associated with the second radio access technology system included in a sub-band identifies that sub-band as being associated with the second radio access technology system.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

The technology provides a frame handler, a frame structure design, and signaling and bandwidth allocation methods for a new OFDMA radio communications system that allows backward compatibility with an existing or legacy OFDMA radio communications system with a lower signal bandwidth. The following technology description is in the non-limiting example context of a new IEEE 802.16m type system and a legacy IEEE 802.16e type system for illustration purposes only. This technology may be used in any modern radio communications system in which similar backward compatibility objectives apply and is not limited to the IEEE 802.16m and IEEE 802.16e standards. OFDM is therefore a non-limiting example, and the technology applies to other multiple access technologies as well unless otherwise stated. Thus, it will be apparent to one skilled in the art that other embodiments may be practiced apart from the specific details disclosed below.

OFDMA transmits a data stream by dividing the data stream over multiple narrow-band sub-carriers, (e.g. 512, 1024, or even more depending on the overall available bandwidth of the channel), which are transmitted simultaneously. The sub-carriers are divided into groups of sub-carriers, each group may also be referred to as a sub-channel. The sub-carriers that form a sub-channel need not be adjacent. Because so many bits are transported in parallel, the transmission speed on each sub carrier can be much lower than the overall resulting data rate. This is important in a practical radio environment in order to minimize effect of multipath fading created by transmitted signals arriving at a receiver via multiple paths at slightly different arrival times of the signal from different directions.

Figure 1:
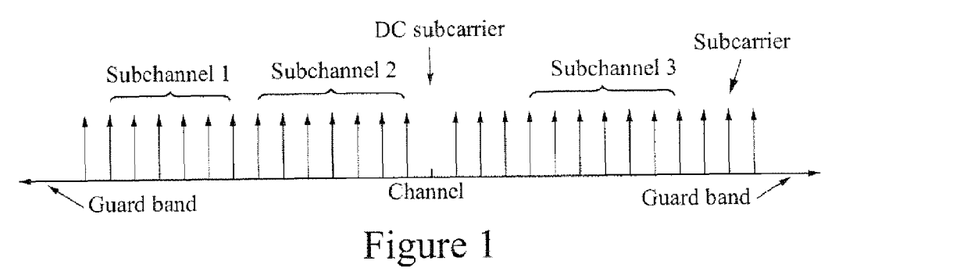
FIG. 1 illustrates an OFDMA channel split into multiple subchannels with each subchannel having multiple subcarriers.

Since the description is in the non-limiting context of 802.16e-802.16m, it first is helpful to review certain aspects of an IEEE 802.16e system. Radio terminals are allocated subsets of sub-carriers in a 5 MHz channel band. Sub-carriers on both edges of the 5 MHz channel band left unused are guard sub-carriers in an 802.16e system. FIG. 1 shows how an 802.16e signal is divided and carried by multiple subchannels along with unused guard sub-carriers at the edges of the 5 MHz channel band. The DC sub-carrier at the center of the 802.16e band is not used to transmit any information.

Figure 2:
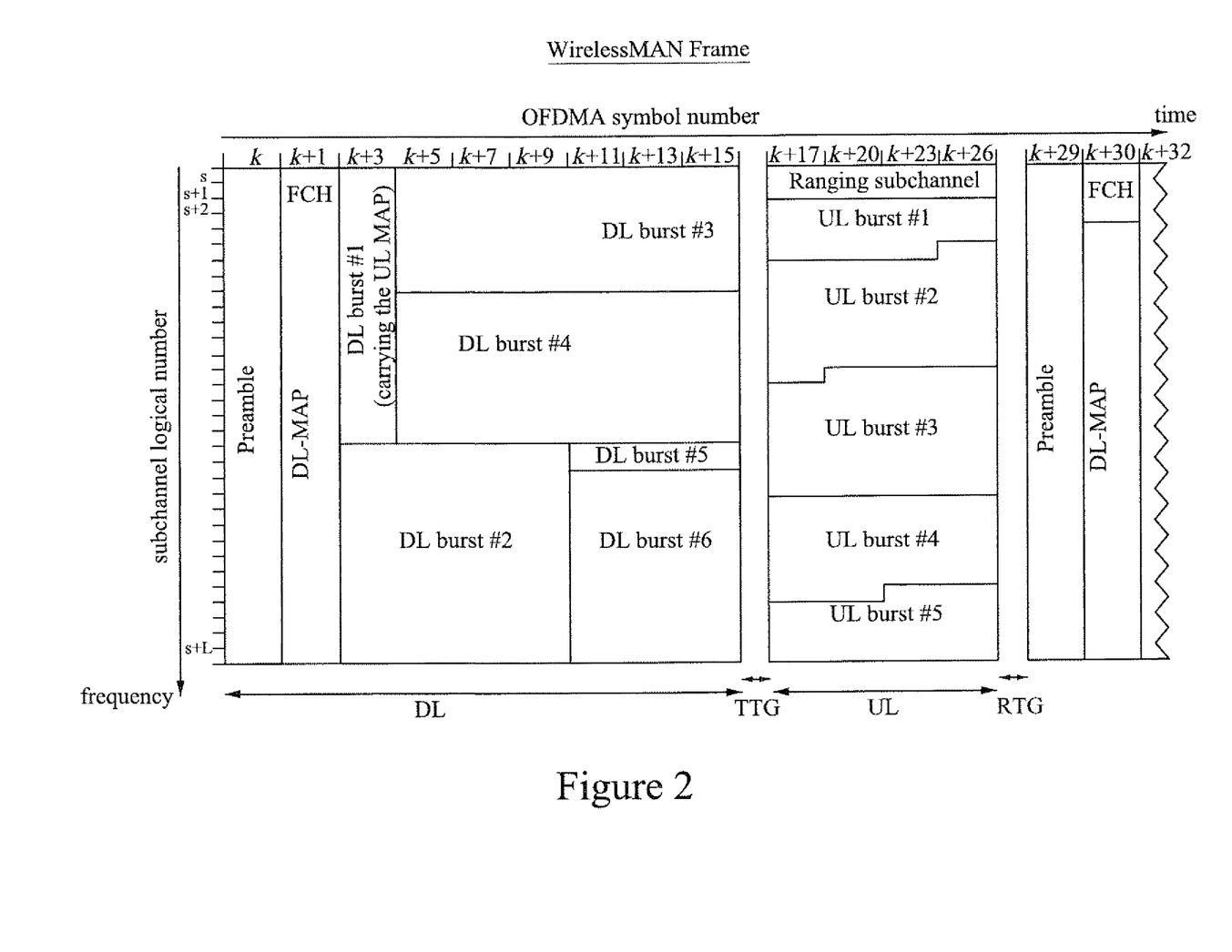
FIG. 2 illustrates a frame structure used in 802.16e.

The frame structure for a WirelessMAN OFDMA transmit signal is shown in FIG. 2. In general, the IEEE 802.16e standard refers to the overall document, while the term "legacy 802.16e terminals" refers to WirelessMAN OFDMA terminals or WiMAX terminals as well. The frame length for the signal is 5 ms, and time division duplexing (TDD) can be used within the frame. The first OFDM symbol, represented in the vertical direction in FIG. 2, is a preamble that facilitates initial synchronization by UEs/radio terminals to the downlink (DL) transmissions, channel estimation, and cell search. A frame control header (FCH) message that follows conveys parameters regarding radio resource "reuse" in the system and coding parameters of the DL-MAP message that follows it. The MAP messages that follow the preamble provide to the radio terminals channel/sub-carrier allocation information. The DL-MAP message in the DL burst #1 contains information regarding downlink bandwidth allocations to radio terminals scheduled in the frame. The DL-MAP message is followed by an uplink UL-MAP message that contains uplink bandwidth allocations. Optionally, the DL-MAP message may be followed by sub-DL-UL-MAP messages that provide the same functionality as DL-MAP and UL-MAP messages, except that more flexibility is provided in the coding rates used for the message to allow for more efficient signaling in the system. The DL-MAP and UL-MAP messages contain allocations for downlink and uplink data bursts, examples of which are shown in FIG. 2, i.e., downlink burst #3, uplink burst #1, etc. The transmit transition gap (TTG) and the receive transition gap (RTG) are used by the radio terminal to switch from receive to transmit and vice versa.

To achieve backward compatibility with the reference WirelessMAN OFDMA signal, these basic frame mechanisms in FIG. 2 need to be preserved in the 802.16m system. In addition, legacy 802.16e radio terminals configured to communicate with narrower legacy bandwidths, e.g., 5 and 10 MHz, need to be able to use this same frame structure even when the higher channel bandwidths, e.g., 15 or 20 MHz, of 802.16m are used. Technology that enables this desired backward compatibility is now described.

It is possible for certain radio terminals to be allocated fewer sub-carriers than other radio terminals within the context of one frame structure when all the radio terminals demodulate the whole OFDM channel bandwidth. But the difficulty comes with radio terminals that have bandwidth limitations that are lower than the overall channel bandwidth used by the system, e.g., IEEE 802.16e radio terminals operating in an IEEE 802.16m system. A novel frame structure design and signaling and bandwidth allocation methods proposed by the inventors allow a legacy (e.g., IEEE 802.16e) radio terminal to communicate with a new (e.g., IEEE 802.16m) base station that is also communicating with new (e.g., 802.16m) radio terminals. Accordingly, for the non-limiting example embodiment, the IEEE 802.16m frame structure design proposed by the inventors is backward compatible with the frame structure of IEEE 802.16e.

Figure 3:
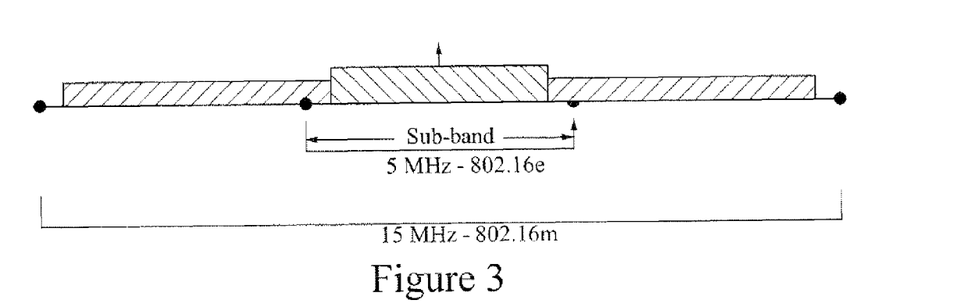
FIG. 3 illustrates incorporating a 5 MHz 802.16e sub-band into a 15 MHz 802.16m channel.

A first feature of the technology embeds one or preferably multiple legacy system channels within a new system's single channel. The example IEEE 802.16m system can use all the sub-carriers in an OFDM channel bandwidth, but the example IEEE 802.16e system can only use subsets of those sub-carriers. Those subsets are referred to as "sub-bands." Accordingly, each legacy 802.16e channel included in the new 802.16m channel corresponds to a sub-band. FIG. 3 shows a simple configuration in which a single 802.16e 5 MHz sub-band is supported within a 802.16m 15 MHz channel bandwidth. The center bandwidth of 5 MHz may be used by 802.16e radio terminals, and nearly all of the 15 MHz channel bandwidth may be used by 802.16m radio terminals.

Figure 4:
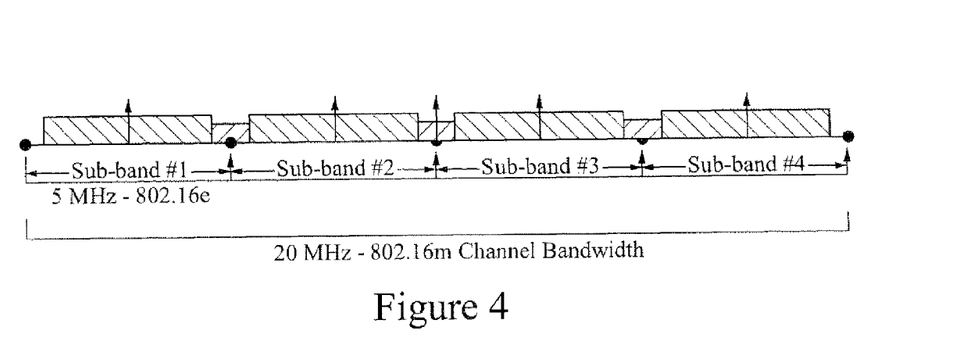
FIG. 4 illustrates incorporating four 5 MHz 802.16e sub-bands into a 20 MHz 802.16m channel.

Another non-limiting example embodiment embedding multiple 802.16e channels/sub-bands within the 802.16m channel is shown FIG. 4 with example bandwidths of 5 MHz and 20 MHz shown for the 802.16e and 802.16m systems, respectively. FIG. 4 shows four 802.16e sub-bands within the 802.16m channel bandwidth. However, as in FIG. 3, some part of the 802.16m bandwidth may optionally not be used for legacy 802.16e radio terminals. Such bandwidth allocations are communicated to the radio terminals using any suitable technique, some examples of which are described below.

The frame structure in the sub-bands used by legacy 802.16e radio terminals remains the same as that of a reference 802.16e system, as shown in FIG. 2. However, the parts of the 802.16m channel bandwidth that are not used for legacy 802.16e radio terminals are open for 802.16m related modifications in the frame structure. When time-division duplexing (TDD) is used to separate downlink and uplink transmissions, the downlink-to-uplink ratio is preferably the same for the 802.16m and 802.16e systems to ensure that there is no interference from the downlink of one system to the uplink of the other system and vice-versa.

A second aspect of the technology uses one or more guard sub-carriers associated with 802.16e channels/sub-bands to transmit data for 802.16m radio terminals. This feature is applicable to legacy systems that employ OFDM. In other words, the OFDM sub-carriers assumed by an 802.16e radio terminal to be guard sub-carriers at the edges of the 5 MHz band may be used for downlink data transmission for 802.16m radio terminals. This use of the guard sub-carriers for downlink transmissions to 802.16m radio terminals should not affect 802.16e radio terminals because the receive filter in the 802.16e radio terminal should filter out these sub-carriers.

In the example shown in FIG. 3, the guard sub-carriers on either side of the 5 MHz center sub-band may be used for 802.16m downlink transmissions. In FIG. 4, the center frequency for the 802.16m system, labeled as "802.16m carrier," lies in the guard sub-carriers at the edges of the 802.16e sub-bands 2 and 3. Most of the sub-carriers that lie within the 802.16e guard bands can be used for transmission to 802.16m radio terminals on the downlink, except for that center sub-carrier for the 802.16m bandwidth and the sub-carriers belonging to the guard bands on the outer edges of the whole bandwidth, i.e., the guard sub-carriers on the lower frequency end of sub-band 1 and the guard sub-carriers on the higher frequency end of sub-band 4. A very small number of subcarriers at the edges of the legacy 5 MHz 16e bands may have to be left unoccupied when the channel spacing is not a multiple of the subcarrier width. On the uplink, the sub-carriers in the 802.16e guard bands may be used for information transmission by an 802.16m radio terminal. However, using these sub-carriers is less useful than on the downlink, especially at higher loads, because the interference in these sub-carriers from 802.16e radio terminal transmissions could be significant. The number of transmitters on the uplink is much greater than on the downlink, which leads to a higher degree of unwanted signal power in the guard bands.

To facilitate the use of these guard sub-carriers, an 802.16e sub-band may be interpreted by an 802.16m radio terminal as having additional sub-carriers in addition to those sub-carriers in the designated 5 MHz sub-band. These additional guard sub-carriers can be viewed as a sub-channel. Thus, an 802.16m radio terminal may be allocated such a subchannel associated with an 802.16e guard sub-band to receive data. As described in conjunction with FIG. 4, the subchannel definition for 802.16m radio terminals indicating use of guard sub-carriers varies depending on the location of the 802.16e sub-band. If the 802.16e sub-band is in the middle of two other sub-bands, then sub-carriers from the guard bands on the left (lower frequency side of the sub-band) and the right (higher frequency side of the sub-band) are included in the sub-channel definition. On the other hand, if the 802.16e sub-band is at the edge of the 802.16m channel, then only the sub-carriers from the guard band not at the edge of the 802.16m channel are included in the sub-channel definition.

A third aspect of the technology signals one or more parameters of the new frame structure from the base station, e.g., from a frame handler or scheduler, to an 802.16m radio terminal in a "base sub-band" using a message directed only to 802.16m-capable radio terminals. The parameters included in such a message include the frame length, channel bandwidth being used, the ratio of downlink to uplink symbols, permutation bases for subchannel definitions, etc.

A fourth aspect of the technology concerns bandwidth allocations for 802.16m radio terminals. Although bandwidth allocations can be made only in one sub-band to an 802.16e radio terminal, for an 802.16m radio terminal, bandwidth allocations may be provided that include multiple 802.16e sub-bands. The total set of allocations is treated as a combined allocation so that transmission of a single coded 802.16m data block may be distributed over the combined allocation. The base sub-band control signaling informs an 802.16m radio terminal to determine which sub-bands together form an 802.16m signal. For example, in FIG. 4, signaling in the base sub-band may inform an 802.16m radio terminal that all four sub-bands may be used to form an 802.16m signal. But a particular bandwidth allocation to an 802.16m radio terminal might span less than four sub-bands.

In the situation where the base sub-band is an 802.16m-only base sub-band, a new message like the 802.16e DL-MAP/UL-MAP message may be transmitted in the 802.16m-only base sub-band to indicate bandwidth allocations for 802.16m radio terminals. Alternatively, the sub-band allocations for 802.16m radio terminals may also be signaled using a different type of message transmitted in the 802.16m-only sub-band. The base station frame handler preferably ensures that the bandwidth allocations made to 802.16e radio terminals exclude the portions of the frame that are allocated to 802.16m radio terminals. In this way, unnecessary signaling overhead in the 802.16e sub-bands is reduced.

Figure 5:
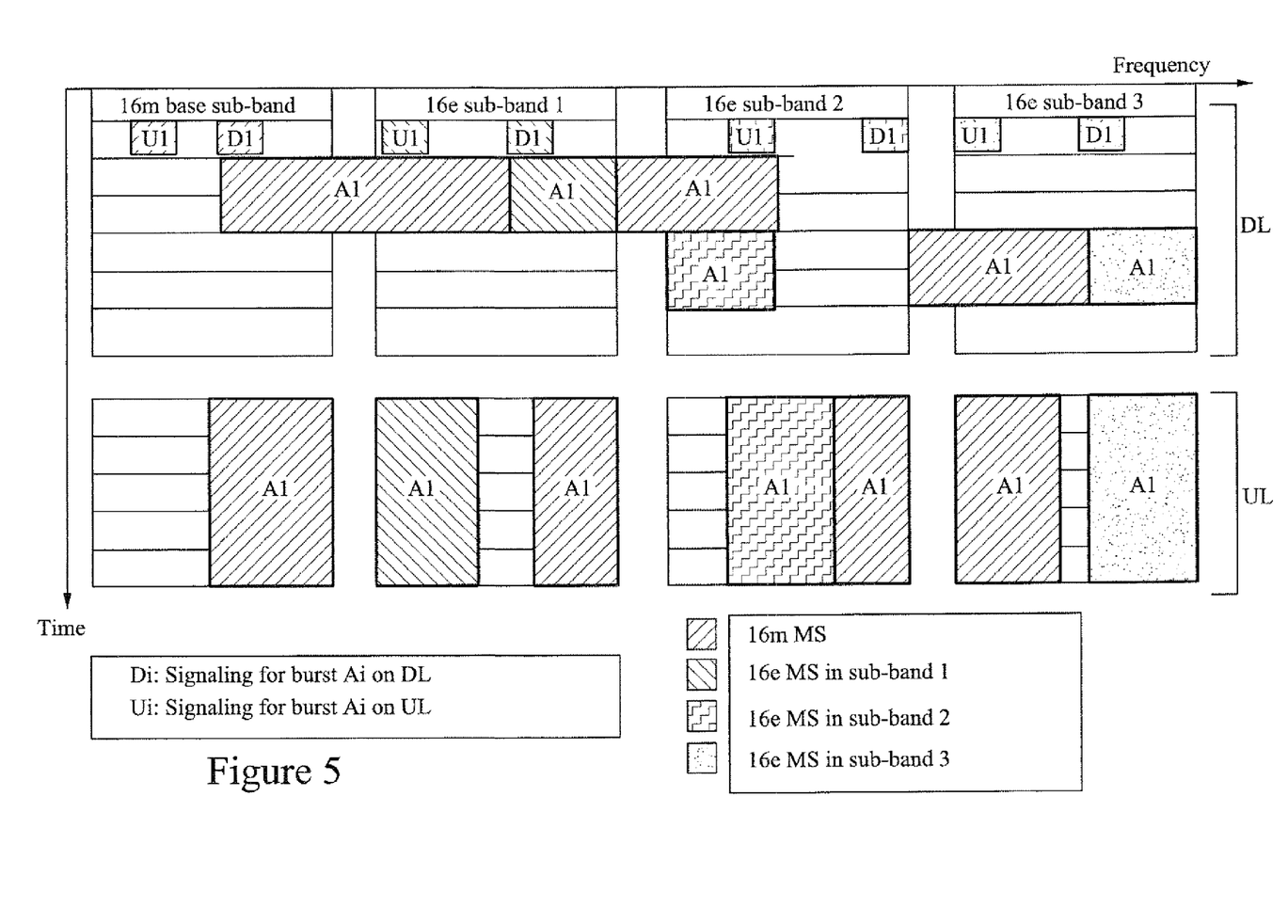
FIG. 5 illustrates a bandwidth allocation method that may be used to make bandwidth allocations for 802.16e and 802.16m transmissions and associated control signaling when the base sub-band is a 802.16m sub-band.

Consider the non-limiting example frame structure in FIG. 5, which is rotated from the frame structure orientation used in FIG. 2 so that frequency is along the horizontal dimension and time along the vertical dimension. New control signaling (labeled D1 indicated with a particular cross hatching) in the 802.16m-only sub-band signals sub-band allocations (labeled A1 indicated with the same cross hatching) to an 802.16m radio terminal in all sub-bands on the downlink. In this illustration, the 802.16m terminal is allocated bandwidth in all four sub-bands. In contrast, sub-band allocations to 802.16e radio terminals in a 802.16e sub-band (labeled A1 using different cross-hatchings or markings) are signaled using DL-MAP signaling messages D1 (labeled A1 using the corresponding one of the different cross-hatchings or markings) within the same 802.16e sub-band.

Figure 6:
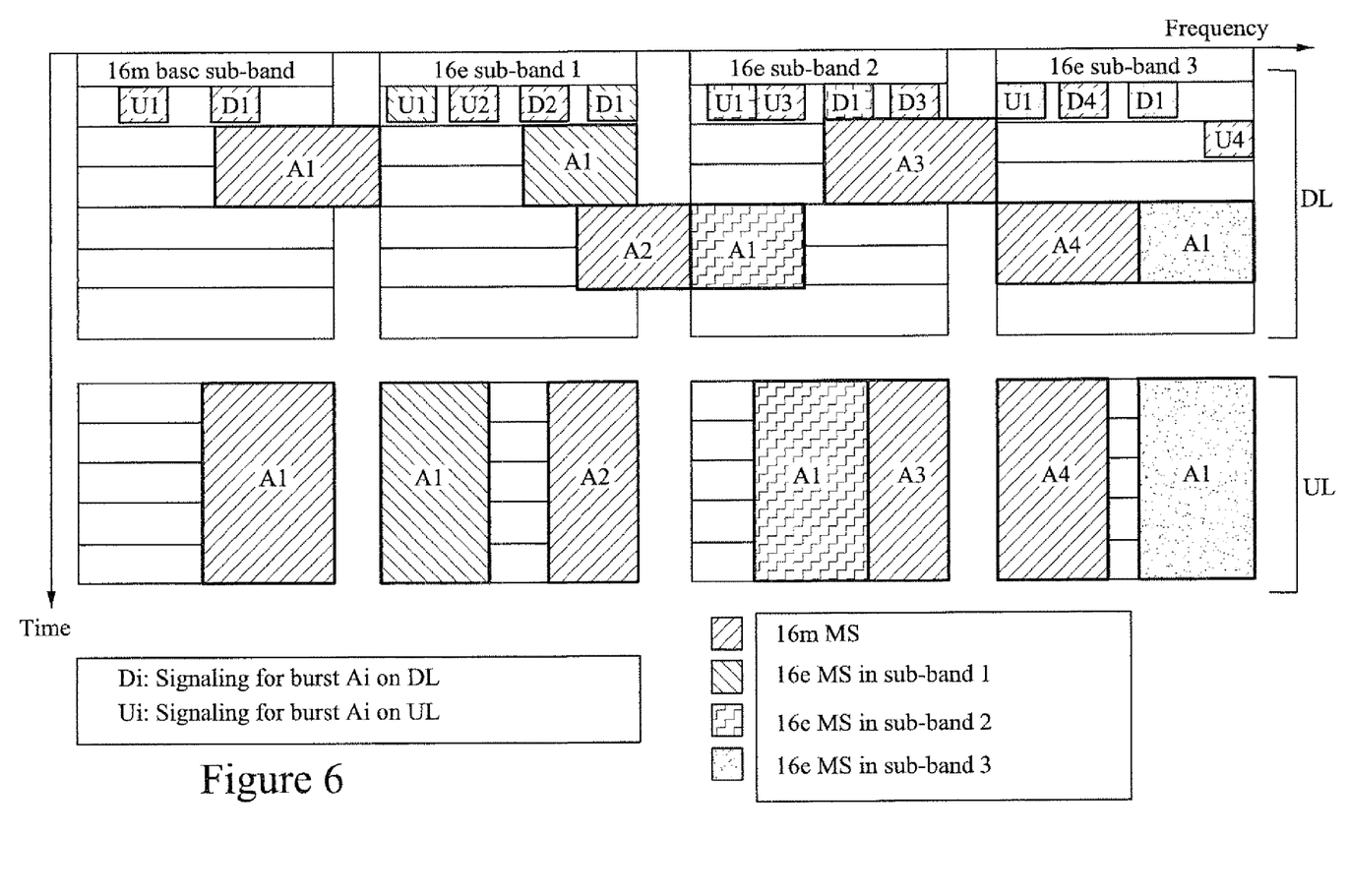
FIG. 6 illustrates a bandwidth allocation method that may be used to make bandwidth allocations for 802.16e and 802.16m transmissions and associated control signaling when the base sub-band is a 802.16e sub-band.

When all sub-bands are needed to serve 802.16e radio terminals, the base sub-band is an 802.16e sub-band. In this case, bandwidth allocations for an 802.16m radio terminal in 802.16e sub-bands may be made using 802.16e control messages in those same sub-bands. Thus, an 802.16m radio terminal reads control messages in each 802.16e sub-band to determine its bandwidth allocation across the whole 802.16m bandwidth and then treats all the sub-band allocations as one combined allocation. An example is shown in FIG. 6 where allocations A1 through A4 for an 802.16m radio terminal on the uplink (shown in a particular cross-hatching) are signaled using UL-MAP signaling messages U1 through U4 (shown in the same cross-hatching) within the same sub-band. Specifically, UL-MAP signaling message U1 in sub-band 1 signals allocation A1 in sub-band 1, UL-MAP signaling message U2 in sub-band 2 signals allocation A2 in sub-band 2, and so on. The sub-band allocations A1 through A4 in FIG. 6 are treated by the 802.16m radio terminal as one combined allocation.

A fifth aspect of the technology signals base sub-bands using preambles. Preambles are used to allow radio terminals to search for cells of the system efficiently, to perform cell identification, and to provide additional information for channel estimation. The use of distinct sets of preambles to indicate base sub-bands allows implicit signaling to the radio terminals identifying base sub-bands and distinguishing them from other sub-bands. For example, a subset of 802.16e preambles for base sub-bands can be used to indicate to an 802.16e radio terminal whether an 802.16e sub-band is a base sub-band. Using selected preambles to identify a base sub-band reduces the complexity of the 802.16m radio terminal by allowing it to find a base sub-band without scanning multiple 802.16e sub-bands and looking for a control message indicating the 802.16m sub-band allocation. An 802.16m radio terminal performs a cell search operation and tries to identify a valid preamble sequence. When an identified preamble belongs to the subset of preambles reserved for base sub-bands, the terminal infers that the sub-band is a base sub-band.

Figure 7:
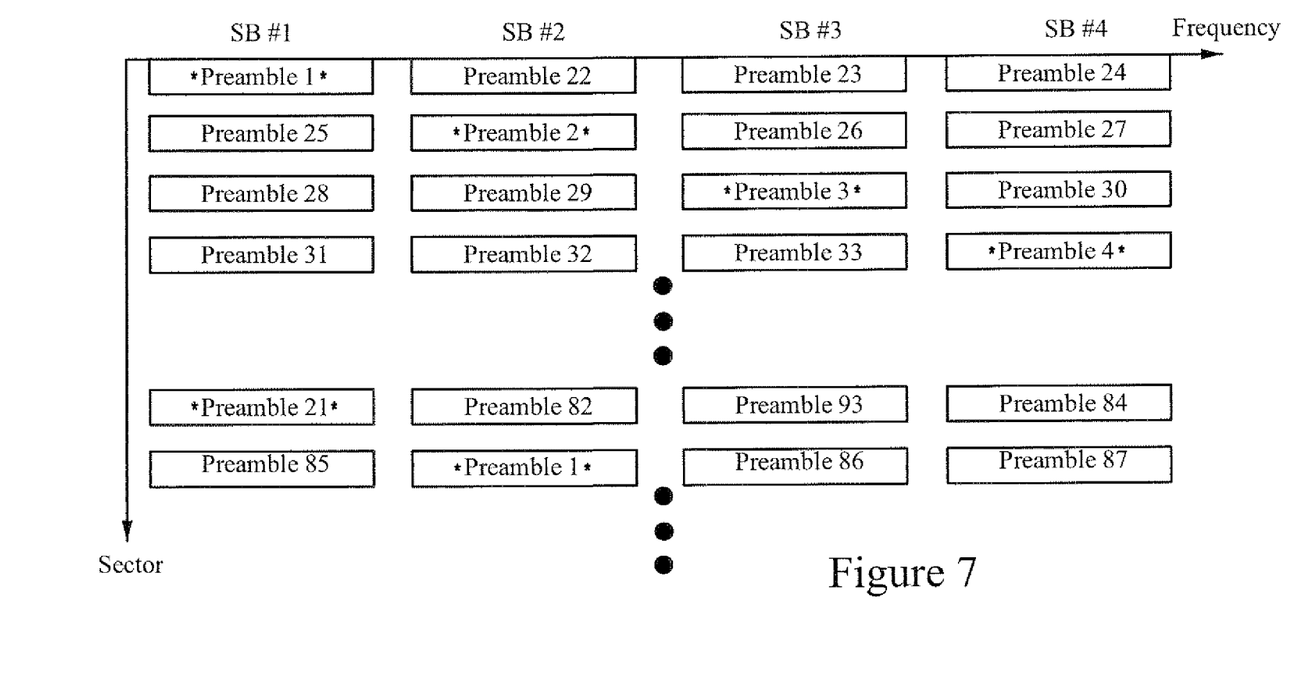
FIG. 7 illustrates using a subset of preambles to indicate base sub-bands when all sub-bands are used for a legacy 802.16e system.

An example shown in FIG. 7 illustrates a subset of 802.16e preambles used to indicate base sub-bands when all sub-bands are used to communicate with 802.16e radio terminals. A reuse pattern of over 21 base station sector cells is assumed in the example, and a subset of 21 preambles is used only for base sub-bands. The remaining preambles are used as normal 802.16e sub-bands. FIG. 7 shows a preamble sequence number used for each of the four sub-bands in each sector with the base sub-bands for each sector being highlighted with asterisks. The preamble sequence numbers used in the figure are for purposes of illustration and are not intended to refer to specific preamble numbers in the IEEE 802.16e specification.

A sixth aspect of the technology uses different preamble sequences to distinguish sub-bands where 802.16e radio terminals may operate from sub-bands where only 802.16m radio terminals may operate. For example, the 802.16e sub-bands can use preamble sequences that are already defined for the 802.16e system. Different preamble sequences may be used for the 802.16m system such that an 802.16e radio terminal would not find a 802.16m sub-band as a result of a cell search operation. Within the sub-bands designated just for 802.16m radio terminals, a subset of the 802.16m preambles can be used to indicate which sub-band is a base sub-band.

Figure 8:
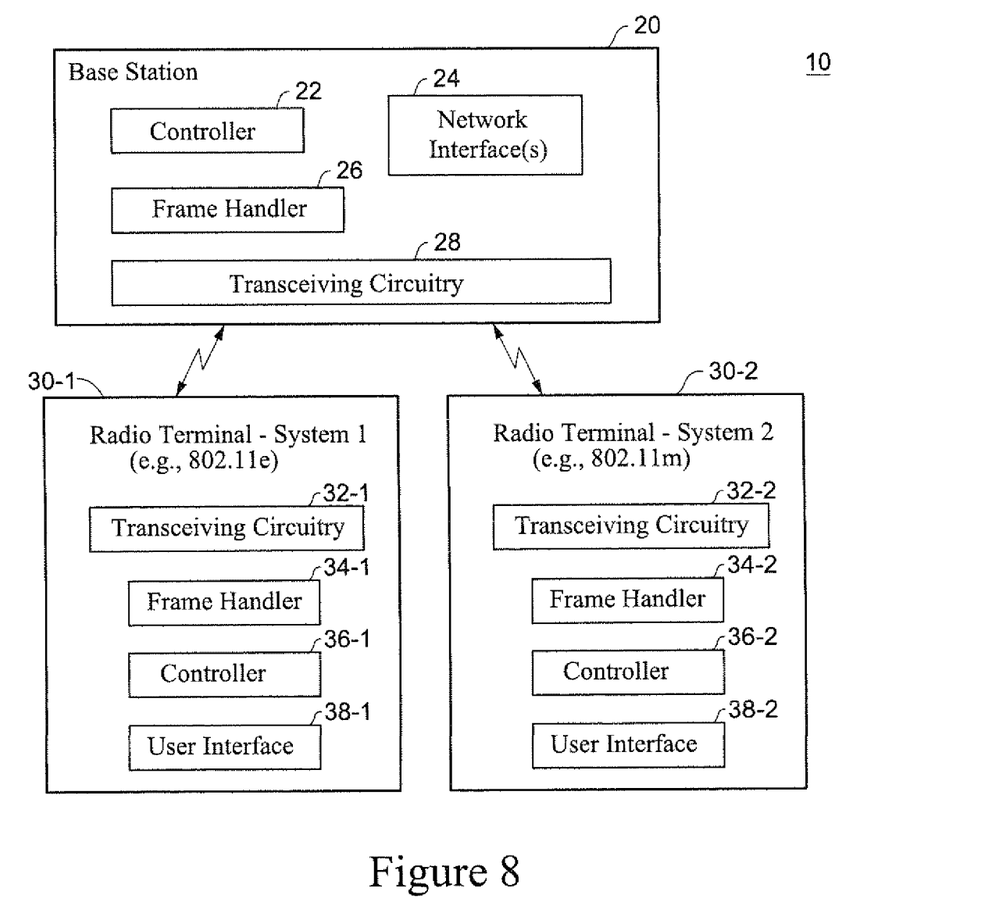
FIG. 8 is a function block diagram of a non-limiting example of a radio communications system permitting communications with a legacy type radio terminal and a new type of radio terminal.

The technology described above may be implemented in an example, non-limiting radio communication system 10 such as that depicted in FIG. 8. A radio base station 20 is typically part of a radio access network that can be connected to one or more external networks. The external networks may comprise, for example, a connection-oriented network such as a public switched telephone network (PSTN), and/or the integrated services digital network (ISDN), and/or connection-less external core networks, such as the internet. The base station 20 includes, among other things, a supervisory controller 22, one or more network interfaces for communicating with other base stations, other radio access network nodes, core network nodes, etc., a frame handler 26, and radio transceiving circuitry 28.

The frame handler 26 formats information to multiple radio terminals before the information is transmitted. In the 16e/16m example from above, the frame handler 26 formats information directed to 802.16e and 802.16m radio terminals. For the first aspect of the technology described above embedding one or more legacy 802.16e channels within a new 802.16m channel, the frame handler receives information pertaining to both 802.16e and 802.16m terminals. It then maps the information directed to 802.16e terminals to the sub-bands supporting 802.16e and the information directed to 802.16m radio terminals across the appropriate sub-bands based on the output of the base station scheduler implemented in this example by the controller 22. For the second aspect of the technology, the frame handler 26 maps information being sent to 802.16m terminals to the guard sub-carriers when the scheduler assigns subchannels occupying the guard sub-carriers to 802.16m radio terminals. For the third aspect of the technology, the controller 22 formulates a control message conveying system parameters, and the frame handler 26 maps the control message to appropriate subchannels in the base sub-band. For the fourth aspect of the technology, the scheduler in the controller 22 allocates bandwidth to 802.16e terminals within their respective sub-bands and to 802.16m terminals across sub-bands. Bandwidth allocation messages are formulated in the controller 22 and are mapped by the frame handler 26 to the appropriate sub-channels in the frame. For the fifth and sixth aspects of the technology, the frame handler 26 maps appropriate preamble sequences to the sub-bands within the frame. This is done so that preambles from a specific subset are used for base sub-bands, i.e., the sub-bands carrying control messages conveying important system parameters. Also, preambles from different subsets are mapped to sub-bands that support 802.16e radio terminals and sub-bands that only support 802.16m radio terminals. The preamble sequences for a sub-band are stored in the controller 22 and may be assigned by an entity other than the base station 20 and communicated to the base station via the network interface 24.

Representative radio terminals 30-1 and 30-2 communicate with base station 20 over a radio or air interface. A radio terminal can be known by various names such as mobile terminal, mobile station, user equipment unit (UE), handset, remote unit, for example. A radio terminal can be a stand alone device or it can be incorporated in any of a myriad of devices or appliances such as laptops, PDAs, stationary computers, appliances, etc. A first type of radio terminal 30-1 communicates based on a particular type of radio access system corresponding to a legacy or reference system, which in the non-limiting example embodiment is an IEEE 802.16e type of system. The radio terminal 30-1 includes transceiving circuitry 32-1, a frame handler 34-1, a supervisory controller 36-1, and a user interface 38-1. The transceiving circuitry 32-1 and frame handler 34-1 are configured to operate in accordance with the legacy access frame structure and frequency bandwidth.

Radio terminal 30-2 can communicate with a new potentially more advanced communications system which in the non-limiting example embodiment is an IEEE 802.16m type of system. The radio terminal 30-2 includes transceiving circuitry 32-2, a frame handler 34-2, a supervisory controller 36-2, and a user interface 38-2. The transceiving circuitry 32-2 and the frame handler 34-2 are configured for communication in both 802.16e and 802.16m type systems that have different frame structures and bandwidth allocations.

The frame handler 34-1 in the legacy radio terminal 30-1 operates in accordance with normal legacy frame formats and signaling, which in the non-limiting example embodiment would be similar to that described in conjunction with FIG. 2 for an 802.16e system. However, the frame handlers 26 and 34-2 in base station 20 and radio terminal 30-2, respectively, perform additional formatting, deformatting, control signaling, modulating, and de-modulating tasks to ensure compatibility between the legacy and new systems. The transceiving circuitry 32-2 is configured to receive an 802.16m signal that has one or more 802.16e signals embedded within it. The frame handler 34-2 is configured to parse the preamble sequences for the various sub-bands from the received signal processed by the transceiving circuitry 32-2. The preamble sequences are then used by the controller 36-2 to decide which sub-bands are 802.16e sub-bands and which sub-bands, if any, are 802.16m-only sub-bands. The preamble sequences are also used to determine which sub-band is the base sub-band. The frame handler 34-2 then extracts the control message from the pail of the received signal corresponding to the base sub-band that provides system parameter information. The controller 36-2 uses the information within the control message to configure the receiver of the radio terminal 30-2. For example, the parameter specifying the number of sub-bands forming an 802.16m signal is used by the frame handler 34-2 to extract messages in subsequent transmissions. Similarly, parameters received within the control message may specify the number of guard sub-carriers that are used for 802.16m radio terminals and the specific configuration of sub-carriers that form a sub-channel within the set of guard sub-carriers. Once key system information has been received, the frame handler 34-2 is configured to receive and process bandwidth allocations for the terminal. A particular bandwidth allocation may be restricted to one sub-band or may span multiple sub-bands, with the sub-bands being 802.16e or 802.16m-only sub-bands.

Figure 9:
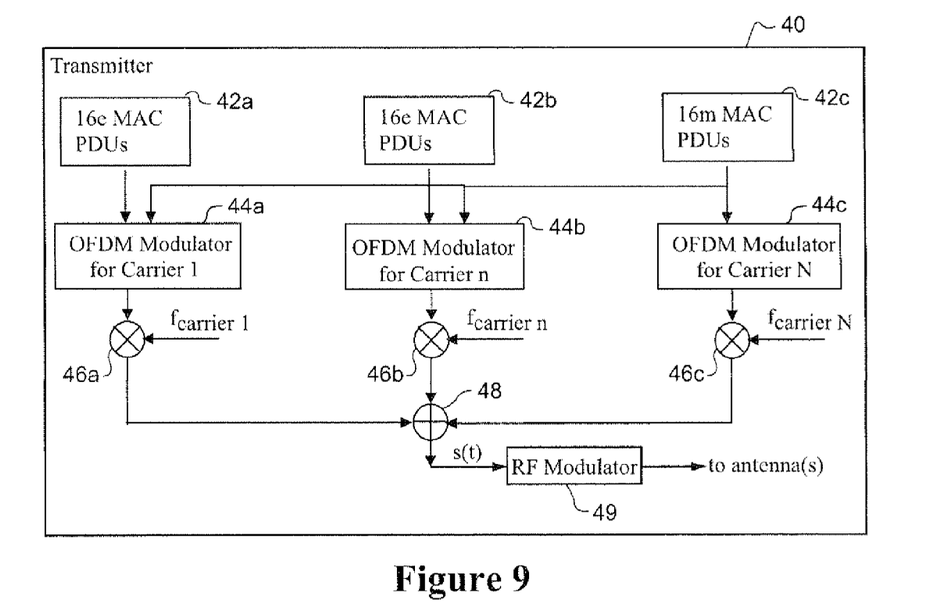
FIG. 9 is a function block diagram of a non-limiting example of a transmitter where the legacy system channel bandwidth is not an integer multiple of the OFDM subcarrier bandwidth.

FIG. 9 illustrates a non-limiting 802.16e-16m example of a base station transmitter 40 that may be used when the sub-carrier bandwidth does not divide evenly into the 802.16e sub-band bandwidth. The simplified function block diagram shows three buffers 42a-42c of N buffers corresponding to N sub-bands that store packet data units (PDUs) provided by the MAC layer to be transmitted on the downlink to radio terminals. Buffers 42a and 42b store PDUs intended for 802.16e radio terminals, and buffer 42c stores PDUs for 802.16m radio terminals. In general, the 802.16m PDUs from the Nth buffer may be sent over all the sub-bands while the 802.16e PDUs from the other buffers can only be sent in their corresponding sub-bands. In the figure, the 802.16e buffer 42a is coupled to a respective OFDM modulator 42a that generates an OFDM signal for a first 802.16e carrier that contains PDUs from the buffer 42a. An OFDM modulator 44b generates a OFDM data signal for an nth 802.16e carrier n that contains PDU data from the buffer 42b. The outputs from the OFDM modulators 44a and 44b are provided to respective frequency mixers 46a and 46b which employ respective carrier signals $F_{carrier\ 1}$ and $F_{carrier\ n}$ to frequency translate those signals to the center frequencies carrier 1 and carrier n, respectively. The center frequencies, carrier 1 and carrier n, each correspond to an associated 16e sub-band contained within the 16m bandwidth. The OFDM modulator 44c output is mixed in a mixer 46c with a carrier corresponding to the center frequency N which corresponds to the Nth or last sub-band which is an 802.16m-only sub-band.

The outputs of the mixers 46a-46c are all summed in a summer 48 that generates a composite baseband OFDM signal s(t). The composite baseband OFDM signal is then provided to an RF modulator 49 that frequency translates the composite signal to a radio frequency (RE) signal which is ten provided to one or more antennas for transmission over the radio interface, e.g., to the radio terminals 30-1 and 30-2. In this example embodiment, where the channel spacing. i.e., the spacing between two sub-bands, is not an integral multiple of the sub-carrier bandwidth, each sub-band requires its own OFDM modulator and frequency translator.

Figure 10:
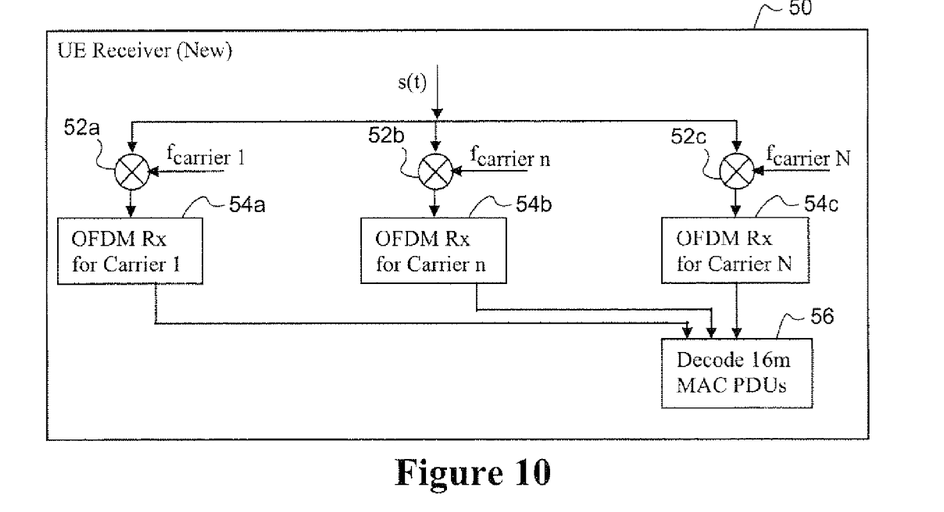
FIG. 10 is a function block diagram of a non-limiting example of a new system radio terminal receiver for receiving information from the transmitter in FIG. 9.

FIG. 10 illustrates a receiver 50 that may be used for example in the radio terminal 30-2. The receiver 50 can receive and decode the information transmitted by the base station transmitter 40 to reproduce the PDUs initially sent. The received REF signal is down-converted to a baseband signal s(t) and provided to N mixers, three of which are represented in the figure by 52a, 52b and 52c. The mixers translate the frequency of the baseband signal s(t) into the respective center frequencies of each of the N sub-bands. The frequency-translated outputs from the N mixers are provided to N OFDM receivers, one for each sub-band. For example, in the figure, the OFDM receiver 54a demodulates data from sub-band 1, OFDM receiver 54b demodulates data from sub-band n, and mixer 52c demodulates data from sub-band N. The demodulated outputs from the receivers for the 802.16e sub-bands, such as 54a and 54b in the figure, as well as those from the receivers for the 802.16m-only sub-bands, such as 54c in the figure, are then decoded in a decoder 56 to generate 802.16m PDUs.

Figure 11:
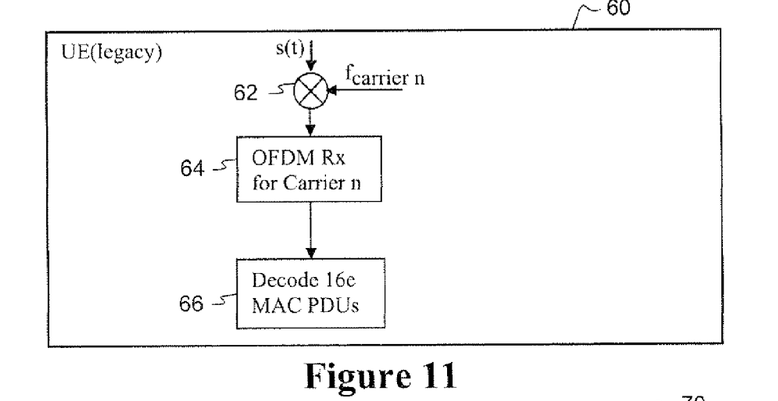
FIG. 11 is a function block diagram of a non-limiting example of a legacy system radio terminal receiver for receiving information from the transmitter in FIG. 9.

FIG. 11 shows a legacy radio terminal receiver 60 in the radio terminal 30-1 and an example of processing that can be performed. The baseband receive signal s(t) is frequency translated via mixer 62 to the center frequency n corresponding to the sub-band at which the legacy 802.16e radio terminal 30-1 is configured to receive. The mixer 62 output is then demodulated in an OFDM receiver 64 for carrier n and decoded in the decoder 66 to generate the 802.16e *PDUs that were transmitted.*

Figure 12:
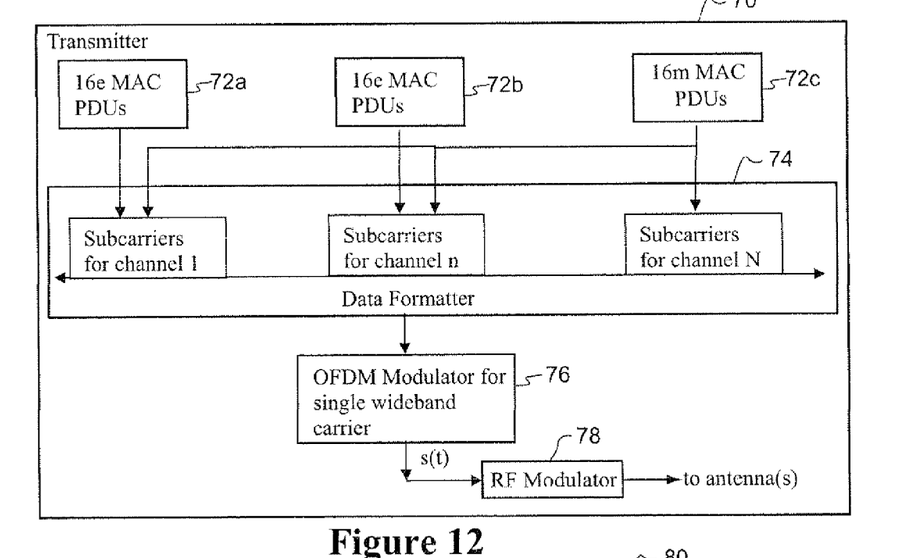
FIG. 12 is a function block diagram of a non-limiting example of a transmitter where the legacy system channel bandwidth is an integer multiple of the OFDM sub-carrier bandwidth.

FIG. 12 illustrates an example base station transmitter 70 for frame handling and transceiver processing if the spacing between 802.16e sub-bands is an integer multiple of the sub-carrier bandwidth. Like the base station transmitter 40, base station transmitter 70 includes buffers 72a and 72b to store 802.16e PDUs and a buffer 72c to store 802.16m PDUs. In contrast to the multiple OFDM modulators 44a-44c required in the base station 40 in FIG. 9, the base station transmitter 70 includes a single OFDM modulator 76. Each of the 802.16e buffers 72a and 72b provides PDUs corresponding to their respective sub-bands, while the buffers containing 802.16m PDUs, such as 72c, provide PDUs that may be transmitted across all sub-bands. The data formatter 74 codes and modulates the PDUs. The coded and modulated PDUs are distributed across the sub-carriers according to the decision of the base station scheduler in the controller 22. The 802.16e coded and modulated PDUs are transmitted in sub-carriers that correspond to a single sub-band that the 802.16e PDU is assigned to by the scheduler. The 802.16m coded and modulated PDUs may allocated to sub-carriers across multiple sub-bands as decided by the scheduler. The data formatter 74 provides a composite signal that is modulated using an OFDM modulator 76 configured for the 802.16m channel to produce an OFDM modulated signal s(t) which is provided to an RF modulator 78 similar to that shown in FIG. 9. Using just one OFDM modulator 76 reduces the hardware costs and complexity of the base station transmitter 70 as compared to the base station transmitter 40.

Figure 13:
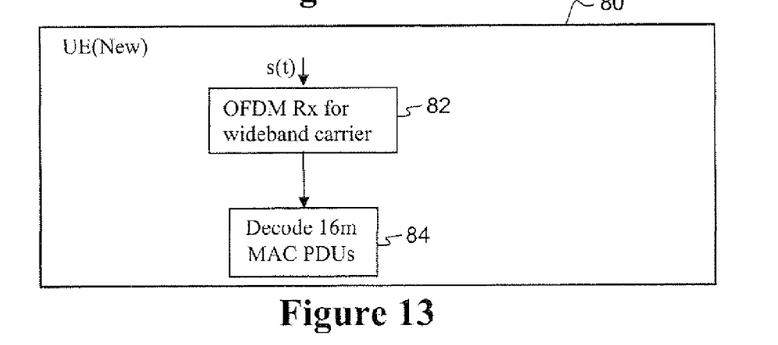
FIG. 13 is a function block diagram of a non-limiting example of a new system radio terminal receiver for receiving information from the transmitter in FIG. 12.

The hardware costs and complexity of the non-limiting example 802.16m radio terminal receiver 80 shown in FIG. 13 and configured to receive signals from the base station transmitter 70 in FIG. 12 are also reduced as compared to the 802.16e receiver shown in FIG. 10. Only a single OFDM receiver 82 associated with the 802.16m channel is required to demodulate the received base band signal s(t). The demodulated signal is decoded by an 802.16m decoder 84 which generates the received PDUs. The receiver of FIG. 11 may be used as described earlier by 802.16e radio terminals to receive the signal generated by the OFDM modulator 76 in FIG. 12 and decode the sub-band of interest.

The technology described allows a seamless transition from a legacy wireless communication system, such as IEEE 802.16e, to an evolution of the system with higher signal bandwidth, such as IEEE 802.16m. The legacy 802.16e channels may be embedded within the larger bandwidth 802.16m signal. Some or all of the sub-bands may be used for legacy 802.16e radio terminals. The technology allows uninterrupted operation of legacy 802.16e radio terminals while providing new 802.16m radio terminals with greater data rates and better performance. Greater efficiency is achieved by using the guard sub-carriers of the 802.16e sub-bands that were previously unused. Greater bandwidths are provided to 802.16m terminals by allowing bandwidth allocations to 802.16m radio terminals across many sub-bands, including sub-bands used for legacy 802.16e radio terminals. Distinctions between 802.16e and 802.16m sub-bands are achieved with minimal overhead by using distinct preamble sequence subsets for the two types of channels. Complexity incurred in system entry and operation of 802.16m terminals is reduced by providing efficient mechanisms to indicate base sub-bands that contain key system and bandwidth allocation information.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A base station of a radio access network comprising:
   transceiver circuitry configured to communicate a frame of information over a radio interface with one or more first radio terminals configured in accordance with a first radio access technology system that permits radio terminal communications over a first channel bandwidth and with one or more second radio terminals configured in accordance with a second radio access technology system that permits radio terminal communications over a second channel bandwidth; and
   a frame handler configured to process data to be transmitted to the first and second radio terminals into a frame with multiple symbol time periods using a frame format that is compatible with both the first radio access technology system and the second radio access technology system so that both the first and second radio terminals may receive and extract data from the frame intended for each of those radio terminals,
   wherein the frame format includes a first data allocation having an amount up to a maximum bandwidth equal to the first channel bandwidth for transmission to one of the first radio terminals during a symbol time period and a second data allocation having an amount up to a maximum bandwidth equal to the second channel bandwidth for transmission to one of the second radio terminals during the same symbol time period, and
   wherein the second channel bandwidth is grater than the first channel bandwidth and spans across at least one first channel bandwidth.

2. The apparatus in claim 1, wherein the frame format is designed for the second radio access technology system and is backward compatible with the first radio access technology system.

3. The apparatus in claim 2, wherein the first radio access technology system is a system that uses IEEE 802.16e technology and the second radio access technology system is a system that uses IEEE 802.16m technology.

4. The apparatus in claim 3, wherein the second channel bandwidth is a multiple of the first channel bandwidth.

5. The apparatus in claim 1, wherein the first radio access technology system and the second radio access technology system are both OFDM-based and wherein the frame format for the first OFDM radio access technology system is backward compatible with the second OFDM radio access technology system but with a lower bandwidth than the first radio OFDM access technology system.

6. A base station of a radio access network comprising:
   transceiver circuitry configured to communicate a frame of information over a radio interface with one or more first radio terminals configured in accordance with a first radio access technology system that permits radio terminal communications over a first channel bandwidth and with one or more second radio terminals configured in accordance with a second radio access technology system that permits radio terminal communications over a second channel bandwidth; and
   a frame handler configured to process data to be transmitted to the first and second radio terminals into a frame with multiple symbol time periods using a frame format that is compatible with both the first radio access technology system and the second radio access technology system so that both the first and second radio terminals may receive and extract data from the frame intended for each of those radio terminals,
   wherein the frame format includes a first data allocation for transmission to the one or more first radio terminals using a sub-band of the second channel bandwidth during a symbol time period, the sub-band corresponding to the first channel bandwidth, and a second data allocation for transmission to one or more of the second radio terminals during the same symbol time period using more than one sub-band included in the second channel bandwidth, and
   wherein the second channel bandwidth is greater than the first channel bandwidth and spans across at least one first channel bandwidth.

7. The apparatus in claim 6, wherein the frame format includes data transmitted to one of the second radio terminals across more than one sub-band in the frame including sub-bands used for first radio terminals and data transmitted to each of the one or more first radio terminals using only a single sub-band for each of the first radio terminals.

8. The apparatus in claim 6, wherein the sub-bands are equipped with guard sub-carriers in the first radio access technology, and
   wherein the frame format includes data transmitted to the one or more second radio terminals using multiple sub-bands and one or more of the guard sub-carriers.

9. The apparatus in claim 6, wherein one or more system parameters defining the frame format are included in a base sub-band, and
   wherein a control message included in the frame is directed to the second radio terminals configured in accordance with the second radio access technology system and indicates system parameters essential to receiving data transmitted to the one or more second radio terminals.

10. The apparatus in claim 6, wherein one or more parameters defining the frame format are included in a base sub-band, and
    wherein the base sub-band includes a control message associated with the first radio access technology system that indicates system parameters essential to receiving data transmitted to the one or more second radio terminals.

11. The apparatus in claim 6, wherein one or more parameters defining the frame format are included in a base sub-band, and
   wherein a use of one or more preamble sequences indicates which of the sub-bands is the base sub-band.

12. The apparatus in claim 6, wherein a first set of one or more preambles associated with the first radio access technology system included in a sub-band identify that sub-band as being associated with the first radio access technology system and a second, different set of one or more preambles associated with the second radio access technology system included in a sub-band identify that sub-band as being associated with the second radio access technology system.

13. The apparatus in claim 12, wherein one or more parameters defining the frame format are included in a base sub-band with a control message directed to the second radio terminals configured in accordance with the second radio access technology system that indicates system parameters associated with receiving data transmitted to the one or more second radio terminals, and
   wherein a subset of the first or second set of one or more preambles indicates which sub-band is the base sub-band.

14. The apparatus in claim 6, wherein bandwidth allocations for a sub-band associated with the first radio access technology system are signaled to radio terminals using one or more control messages within that sub-band such that each of the first radio terminals only receives bandwidth allocations in one sub-band while at least one of the second radio terminals receives bandwidth allocations in multiple sub-bands which are combined and treated as one bandwidth allocation.

15. The apparatus in claim 14, wherein the bandwidth allocations include downlink and uplink bandwidth allocations.

16. A method for operating a base station in a radio access network comprising:
   communicating a frame of information over a radio interface with one or more first radio terminals configured in accordance with a first radio access technology system that permits radio terminal communications over a first channel bandwidth and with one or more second radio terminals configured in accordance with a second radio access technology system that permits radio terminal communications over a second channel bandwidth; and
   processing data to be transmitted to the first and second radio terminals into a frame with multiple symbol time periods using a frame format that is compatible with both the first radio access technology system and the second radio access technology system so that both the first and second radio terminals may receive and extract data from the frame intended for each of those radio terminals,
   wherein the frame format includes a first data allocation having an amount up to a maximum bandwidth equal to the first channel bandwidth for transmission to one of the first radio terminals during a symbol time period and a second data allocation having an amount up to a maximum bandwidth equal to the second channel bandwidth for transmission to one of the second radio terminals during the same symbol time period, and
   wherein the second channel bandwidth is greater than the first channel bandwidth and spans across at one first channel bandwidth.

17. The method in claim 16, wherein the frame format is designed for the second radio access technology system and is backward compatible with the first radio access technology system.

18. The method in claim 17, wherein the first radio access technology system is a system that uses IEEE 802.16e technology and the second radio access technology system is a system that uses IEEE 802.16m technology.

19. The method in claim 18, wherein the first second channel bandwidth is a multiple of the first channel bandwidth.

20. The method in claim 16, wherein the first radio access technology system and the second radio access technology system are both OFDM-based and wherein the frame format for the first OFDM radio access technology system is backward compatible with the second OFDM radio access technology system but with a lower bandwidth than the first radio OFDM access technology system.

21. A method for operating a base station in a radio access network comprising:
   communicating a frame of information over a radio interface with one or more first radio terminals configured in accordance with a first radio access technology system that permits radio terminal communications over a first channel bandwidth and with one or more second radio terminals configured in accordance with a second radio access technology system that permits radio terminal communications over a second channel bandwidth; and
   processing data to be transmitted to the first and second radio terminals into a frame with multiple symbol time periods using a frame format that is compatible with both the first radio access technology system and the second radio access technology system so that both the first and second radio terminals may receive and extract data from the frame intended for each of those radio terminals,
   wherein the frame format includes a first data allocation for transmission to the one or more first radio terminals using a sub-band of the second channel bandwidth, the sub-band corresponding to the first channel bandwidth, and a second data allocation for transmission to one or more of the second radio terminals during the same symbol time period using more than one sub-band included in the second channel bandwidth, and
   wherein the second channel bandwidth is greater than the first channel bandwidth and spans across at least one first channel bandwidth.

22. The method in claim 21, wherein the frame includes data transmitted to one of the second radio terminals across more than one sub-band in the frame including sub-bands used for first radio terminals and data transmitted to each of the one or more first radio terminals using only a single sub-band for each of the first radio terminals.

23. The method in claim 21, wherein control messages indicating the sub-bands used to transmit data to the second radio terminals are transmitted in sub-bands used for transmission of data to the first radio terminals.

24. The method in claim 21, wherein control messages indicating the sub-bands used to transmit data to the second radio terminals are transmitted in sub-bands used for transmission of data only to the second radio terminals.

25. The method in claim 21, wherein the sub-bands are equipped with guard sub-carriers in the first radio access technology, and
   wherein the frame includes data transmitted to the one or more second radio terminals using multiple sub-bands and one or more of the guard sub-carriers.

26. The method in claim 21, wherein one or more parameters defining the frame are included in a base sub-band, and wherein a control message included in the frame is directed to the second radio terminals configured in accordance with the second radio access technology system and indicates system parameters associated with to receiving data transmitted to the one or more second radio terminals.

27. The method in claim 21, wherein one or more parameters defining the frame are included in a base sub-band, and wherein the base sub-band includes a control message associated with the first radio access technology system that indicates system parameters essential to receiving data transmitted to the one or more second radio terminals.

28. The method in claim 21, wherein one or more parameters defining the frame are included in a base sub-band, and wherein a use of one or more preambles sequences indicates which of the sub-bands is the base sub-band.

29. The method in claim 21, wherein a first set of one or more preambles associated with the first radio access technology system included in a sub-band identify that sub-band as being associated with the first radio access technology system and a second, different set of one or more preambles associated with the second radio access technology system included in a sub-band identify that sub-band as being associated with the second radio access technology system.

30. The method in claim 29, wherein one or more parameters defining the frame are included in a base sub-band with a control message directed to the second radio terminals configured in accordance with the second radio access technology system that indicates system parameters associated with to receiving data transmitted to the one or more second radio terminals, and
wherein a subset of the first or second set of one or more preambles indicates which sub-band is the base sub-band.

31. The method in claim 21, wherein bandwidth allocations for a sub-band associated with the first radio access technology system are signaled to radio terminals using one or more control messages within that sub-band such that each of the first radio terminals only receives bandwidth allocations in one sub-band while at least one of the second radio terminals receives bandwidth allocations in multiple sub-bands which are combined and treated as one bandwidth allocation.

32. The method in claim 31, wherein the bandwidth allocations include downlink and uplink bandwidth allocations.

33. Radio terminal apparatus, comprising:
transceiver circuitry for communicating a frame of information over a radio interface to a base station, where the radio terminal and the base station are configured in accordance with a first radio access technology system that permits radio communications over a first channel bandwidth that is different than a second channel bandwidth associated with a second radio access technology that the base station is also configured to support, where the first channel bandwidth configured in accordance with the first radio access technology includes multiple sub-bands, with each sub-band corresponding to the second bandwidth and one or more of the sub-bands is configured in accordance with the second radio access technology; and
a frame handler configured to process data to be transmitted to the base station into a frame with multiple symbol time periods using a frame format that is compatible with both the first radio access technology and the second radio access technology, where the data is allocated for transmission across multiple sub-bands, and
wherein the frame format includes a first data allocation having an amount up to a maximum bandwidth equal to the first channel bandwidth for transmission to one of the first radio terminals during a symbol time period and a second data allocation having an amount up to a maximum bandwidth equal to the second channel bandwidth for transmission to one of the second radio terminals during the same symbol time period, and
wherein the first channel bandwidth is greater than the channel bandwidth and spans across at least one first channel bandwidth.

34. The apparatus in claim 33, wherein the first radio access technology is IEEE 802.16m technology and the second radio access technology uses IEEE 802.16e technology.

35. The apparatus in claim 34, wherein the sub-bands include guard sub-carriers in the second radio access technology, and
wherein the frame format includes data transmitted using multiple sub-bands and one or more of the guard sub-carriers.

36. The apparatus in claim 34, wherein the transceiver circuitry includes an OFDM receiver for demodulating a signal from the base station transmitted across the first channel bandwidth and decode the signal.

37. The apparatus in claim 36, wherein the decoded signal includes a base sub-band containing a control message with one or more parameters defining the frame format.

38. The apparatus in claim 37, wherein a use of one or more preamble sequences sent by the base station indicates which of the sub-bands is the base sub-band.

39. The apparatus in claim 38, wherein the OFDM receiver determines which of the sub-bands is the base sub-band based on the preambles transmitted by the base station within the sub-band.

40. The apparatus in claim 36, wherein the OFDM receiver is configured to process information transmitted in guard sub-carriers of the sub-bands corresponding to the second radio access technology.

41. The apparatus in claim 36, wherein the signal from the base station contains control messages indicating the sub-bands used to transmit data to the second radio terminals is transmitted in sub-bands used for transmission of data to the first radio terminals.

42. The apparatus in claim 36, wherein the signal from the base station contains control messages indicating the sub-bands used to transmit data to the second radio terminals is transmitted in sub-bands used for transmission of data only to the second radio terminals.

43. The apparatus in claim 33, wherein the first radio access technology system and the second radio access technology system are both OFDM-based and wherein the frame format for the first OFDM radio access technology system is backward compatible with the second OFDM radio access technology system but with a lower bandwidth than the first radio OFDM access technology system.

* * * * *

UNITED STATES PATENT AND TRADEMARK OFFICE
CERTIFICATE OF CORRECTION

| | | |
|---|---|---|
| PATENT NO. | : 8,861,549 B2 | Page 1 of 1 |
| APPLICATION NO. | : 12/170579 | |
| DATED | : October 14, 2014 | |
| INVENTOR(S) | : Koorapaty et al. | |

It is certified that error appears in the above-identified patent and that said Letters Patent is hereby corrected as shown below:

Title Page

On Page 2, (56), under "OTHER PUBLICATIONS", in Column 2, Line 4, delete "May 20, 200" and insert -- May 20, 2009 --, therefor.

In the Specification

In Column 10, Line 63, delete "the pail" and insert -- the part --, therefor.

In Column 11, Line 26, delete "modulator 42a" and insert -- modulator 44a --, therefor.

In Column 11, Line 45, delete "(RE)" and insert -- (RF) --, therefor.

In Column 11, Line 45, delete "ten" and insert -- then --, therefor.

In Column 11, Line 48, delete "spacing." and insert -- spacing, --, therefor.

In Column 11, Line 56, delete "REF" and insert -- RF --, therefor.

In the Claims

In Column 13, Line 57, in Claim 1, delete "grater than" and insert -- greater than --, therefor.

In Column 15, Line 66, in Claim 16, delete "at one" and insert -- at least one --, therefor.

In Column 17, Line 49, in Claim 33, delete "Radio" and insert -- A radio --, therefor.

Signed and Sealed this
Thirtieth Day of June, 2015

Michelle K. Lee
*Director of the United States Patent and Trademark Office*